July 21, 1959
A. MAIER
2,896,049
ELECTRICAL APPARATUS
Filed Feb. 8, 1955
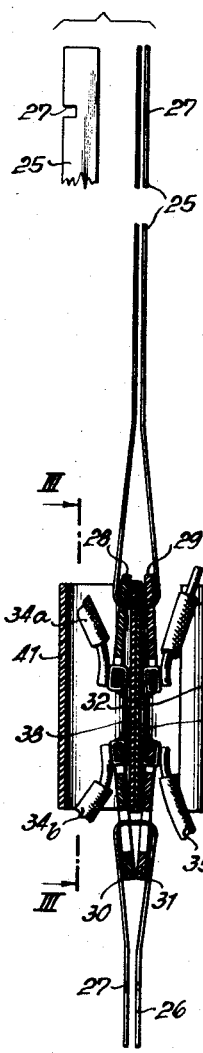
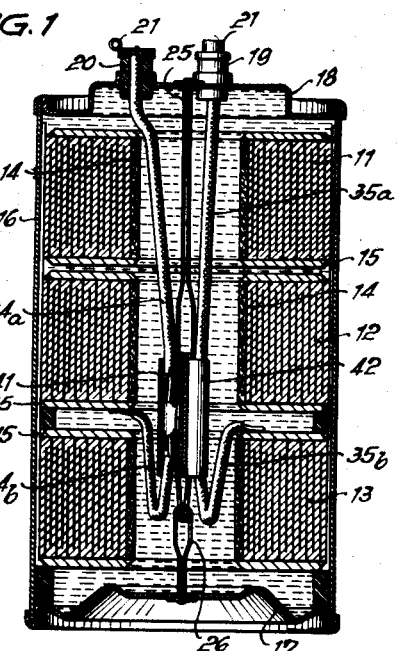
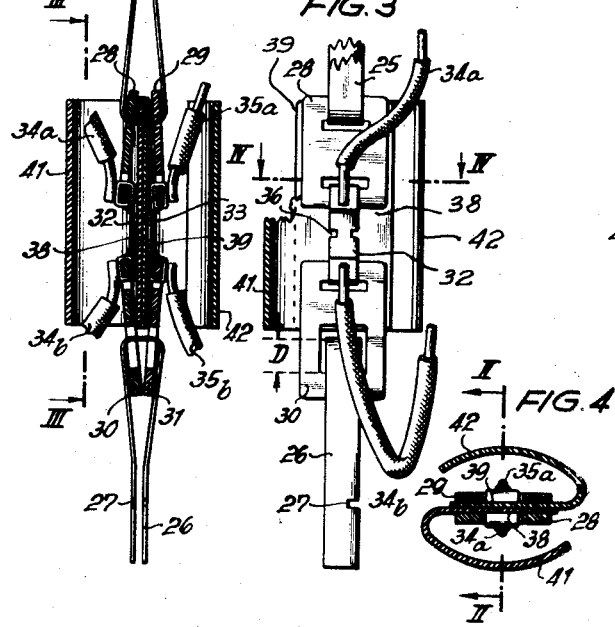
INVENTOR:
Alfred Maier
by:
Michael S. Striker
agt.

United States Patent Office 2,896,049
Patented July 21, 1959

2,896,049

ELECTRICAL APPARATUS

Alfred Maier, Stuttgart, Germany, assignor to Robert Bosch G.m.b.H., Stuttgart, Germany Application February 8, 1955, Serial No. 486,954

Claims priority, application Germany February 20, 1954

6 Claims. (Cl. 200—113)

The present invention relates to electrical apparatus. More particularly, the present invention relates to electrical apparatus having built-in circuit breakers.

In certain types of electrical apparatus, it is advantageous to provide circuit breakers mounted directly within the housing of the electrical apparatus. This is particularly advantageous in apparatus operating with high voltages and currents. For example, an oil filled capacitor is usually used in high voltage and high current circuits. During operation, the temperature of the insulating oil used in the capacitor rises considerably. In the event of a continuous overload it is possible for the heat generated by the hot insulating oil to cause expansion of the housing of the capacitor with a resultant rupture.

Accordingly, it is an object of the present invention to provide a new and improved circuit breaker which is adapted to be mounted directly within the housing of electrical apparatus.

Another object of the present invention is to provide a new and improved circuit breaker adapted to be mounted internally of electrical apparatus and to be operated by expansion of the housing of the apparatus.

A further object of the present invention is to provide a circuit breaker adapted to be used with apparatus energized by a three-phase power supply.

Still another object of the present invention is to provide a new and improved electrical capacitor adapted to be operated with a three-phase power supply and containing an internally mounted circuit breaker.

With the above objects in view, the present invention mainly consists of electrical apparatus including a housing member, at least two current-carrying members mounted within the housing, an electrically conductive connector mounted between the current-carrying members, a first actuating member secured to the electrically conductive connector and also secured to a first point of the housing member, and a second actuating member secured to the electrically conductive connector spaced from that place at which the first actuating member is secured, the second actuating member also being secured to a point of the housing member spaced from and arranged substantially opposite the first point of the housing member to which the first actuating member is secured whereby upon movement of the two points of the housing in a direction away from each other, the actuating members will exert a force upon the electrically conductive connector, breaking the same and interrupting electrical connection between the two current-carrying members.

The novel features which are considered as characteristic for the invention are set forth in particular in the appended claims. The invention itself, however, both as to its construction and its method operation, together with additional objects and advantages thereof, will be best understood from the following description of specific embodiments when read in connection with the accompanying drawings, in which:

Fig. 1 is a longitudinal cross-sectional view of an electrical capacitor containing an internally mounted circuit breaker in accordance with the principles of the present invention;

Fig. 2 is a cross-sectional view taken along line II—II of Fig. 4;

Fig. 3 is a cross-sectional view taken along the line III—III of Fig. 2;

Fig. 4 is a cross-sectional view taken along the line IV—IV of Fig. 3; and

Fig. 5 is a cross-sectional view of another embodiment of a circuit breaker constructed in accordance with the principles of the present invention.

Referring now to Fig. 1, it can be seen that the apparatus is mounted within a housing 16 having a bottom member 17 and a cover member 18. Three capacitor windings 11, 12 and 13 are mounted within the housing 16. These windings are made in the conventional manner, where two electrically conductive sheets, separated by a suitable dielectric, are wound about an electrically insulated core designated as 14 in Fig. 1. One of the electrically conductive sheets is connected to a common terminal 15 which may be sprayed on to one side of the respective capacitor winding. The other terminals of the three capacitors 11, 12 and 13 are connected together by a conductor not shown.

Connected to the terminal 15 of the capacitor 12 is one end of a conductor 34b the other end of which is connected to one side of the circuit breaker 32 (see Fig. 3). The other end of the circuit breaker 32 is connected to one end of a conductor 34a the other end of which extends up through the cover 18 to the lead-in terminal 20. At the terminal 20 is connected a connector 21 which is electrically connected to the conductor 34a and which is adapted to be connected to one phase of a three-phase power supply.

Connected to the terminal 15 of the capacitor 13 is one end of a conductor 35b the other end of which is connected to a circuit breaker 33 (see Fig. 2). The other end of the circuit breaker 33 is connected to one end of a conductor 35a, the other end of which extends up through the cover 18 and is mounted within the lead-in terminal 19. A second connector 21 is electrically connected to the conductor 35a at terminal 19. It is apparent that the terminals 19 and 20 electrically insulate the conductors 35a and 34a respectively from the cover 18 of the housing 16.

Accordingly it is seen that the circuit breakers 32 and 33 are connected in series respectively with capacitors 12 and 13 so that any voltage applied to these capacitors or current flowing therethrough must first flow through the circuit breakers. The term "circuit breaker" is used as a generic term to indicate any switching or fusing mechanism which will interrupt current flow through a circuit upon the happening of an undesired event.

Referring now to Figs. 1, 2 and 3 it can be seen that the lower end of the circuit breaker 32 is folded about an electrically insulated member 30 and passes through an opening therein. Similarly, the lower end of the circuit breaker 33 is folded about an electrically insulated member 31 and extends through an upper opening therein. The lower ends of members 30 and 31 are formed with larger openings through which an actuating member 26 is looped. The free ends of the actuating member 26 contain notches 27 which are folded and fastended in the bottom member 17 of the housing 16.

Similarly, the upper ends of the circuit breakers 32 and 33 are folded about electrically insulated members 28 and 29 respectively. The upper ends of the members 28 and 29 contain openings through which is looped a second actuating member 25. Member 25 is fastened in the cover member 18 of the housing 16. It can be seen in Fig. 3 that the lower opening in members 30 and 31 are substantially larger than the other openings and that the bottom actuating member 26 is spaced from the lower edge of the opening by a distance D.

The circuit breakers 32 and 33 are electrically insulated from each other by means of members 38 and 39 which may be made of an electrically insulating material such as pressboard. The members 38 and 39 are formed with arcuate portions 41 and 42 respectively. These members may best be seen in Fig. 4.

The cover 18 of the capacitor actually has three terminals mounted therein but only two terminals as shown so as not to unnecessarily complicate the drawing. It is apparent that the third terminal is connected to the third capacitor winding 11. As mentioned hereinabove the other terminals of the three capacitor windings may be connected together to a common terminal which in turn may be connected to the housing of the capacitor. The interior of the housing of the capacitor is filled with insulating oil to permit the capacitor to be used with high voltages and currents.

In operation, the three terminals of the capacitor are connected respectively to the three-phase power supply. The current from the supply flows through the capacitor winding 11 without any circuit breaker. However, the current flowing through capacitor windings 12 and 13 also flows through the circuit breakers 32 and 33 respectively. Therefore, in the event of any sustained overload of current through the three-phase capacitor, the temperature of the insulating oil within the housing will be raised to such an extent that it will cause deflection of the housing. It is apparent that in such an event, the cover 18 and the bottom member 17 will be moved in a direction away from each other. This will cause the actuating members 25 and 26 to be moved away from each other. At the start of such movement the circuit breakers will not be actuated due to the distance D between the actuating member 26 and the insulating member 30. Therefore, if the overload current through the capacitor only continues for a short time interval, the temperature of the insulating oil will decrease with corresponding movement of the bottom member 17 and the cover 18 back toward each other.

However, if the cover 18 and the bottom member 17 are moved away from each other an amount greater than the distance D, the circuit breakers 32 and 33 will be pulled apart at their weakened grooved portions 36. This will effectively interrupt current flow through two phases of the three-phase supply thereby preventing any further increase in temperature of the insulating oil and rupture of the capacitor housing.

It is apparent that the circuit breakers 32 and 33 need only to be constructed of an electrically conductive material with the desired tensile strength. For example, tin plated pieces of copper foil may be used.

Referring now to Fig. 5, a circuit breaker is shown for use in electrical apparatus having a one-phase supply. In this embodiment, the actuating member 25 is looped only through the members 28 and 38 and the actuating member 26 is looped through member 30. In the event of an expansion beyond a predetermined desired amount the circuit breaker 32 will be opened as before to interrupt current flow.

It will be understood that each of the elements described above, or two or more together, may also find a useful application in other types of electrical apparatus differing from the types described above.

While the invention has been illustrtaed and described as embodied in a three-phase capacitor having an internally mounted circuit breaker, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In combination, electrical apparatus including a housing member; at least two current-carrying members mounted within said housing; an electrically conductive connector strip mounted between said current-carrying members, said connector strip being formed with a portion having a reduced cross section; a first pulling strip secured to said electrically conductive connector and also secured to a first point of said housing member; a second pulling strip secured to said electrically conductive connector strip spaced from that place at which said first pulling strip is secured, said second pulling strip also being secured to a point of said housing member spaced from and arranged substantially opposite said first point of said housing member to which said first pulling strip is secured; and a difficultly vaporizable fluid substantially filling the remainder of said housing, whereby upon expansion of said fluid and resulting movement of said two points of said housing in a direction away from each other, said pulling strips will exert a pulling force upon said electrically conductive connector strip, breaking the same and interrupting electrical connection between said two current-carrying members.

2. In combination, electrical apparatus including a fluid-tightly closed housing having a cover member and a bottom member; at least two current-carrying members mounted within said housing; an electrically conductive connector strip mounted between said current-carrying members and electrically connected thereto and being formed with a portion having a reduced cross-section; a pair of insulating plates extending spaced from each other substantially in a plane transverse to said cover member and said bottom member, and opposite ends of said connector strip being fastened to the plates, respectively, in the region of the facing ends of the latter; a pair of pulling strips in said housing, one of the pulling strips being fastened at one end thereof to a portion of said cover member and at the other end thereof to the other end of the insulating plate adjacent said cover member and the other of said pulling strips being fastened at one end thereof to a portion of said bottom member and at the other end thereof to the other end of the other insulating plate; and a fluid substantially filling the remainder of the housing, whereby upon expansion of said fluid and resulting movement of said portions of said cover member and bottom member in a direction away from each other, said pulling strips will tend to separate said insulating plates further from each other and exert thereby a pulling force upon said connector strip, breaking the same and interrupting electrical connection between said two current carrying members.

3. In combination, electrical apparatus including a fluid-tightly closed housing having a cover member and an inwardly curved bottom member; at least two current-carrying members mounted within said housing; an electrically conductive connector strip mounted between said current-carrying members and electrically connected thereto and being formed with a portion having a reduced cross-section; a pair of insulating plates extending spaced from each other substantially in a plane transverse to said cover member and said bottom member, and opposite ends of said connector strip being fastened to the plates, respectively, in the region of the facing ends of the latter; a pair of pulling strips in said housing, one of the pulling strips being fastened at one end thereof to a substantially central portion of said cover member and at the other end thereof to the other end of the insulating plate adjacent said cover member and the other of said pulling strips being fastened at one end thereof to a substantially central portion of said bottom member and at the other end thereof to the other end of the other insulating plate; and a fluid substantially filling the remainder of the housing, whereby upon expansion of said fluid and resulting movement of said portions of said cover member and bottom member in a direction away from each other, said pulling strips will tend to separate said insulating plates further from each other and exert thereby a pulling force upon said connector strip, breaking the same and interrupting electrical connection between said two current carrying members.

4. In combination, electrical apparatus including a fluid-tightly closed housing; at least two current-carrying members mounted within said housing; an electrically conductive connector mounted between said current-carrying members; a first pulling member secured to said electrically conductive connector and also secured to a first point of said housing member; a second pulling member secured to said electrically conductive connector spaced from said point at which said first pulling member is secured, said second pulling member also being secured to a point of said housing spaced from and arranged substantially opposite said first point of said housing to which said first pulling member is secured; and a fluid substantially filling the remainder of said housing, whereby when said electrical apparatus is overloaded during considerable time said fluid will be heated and expand sufficiently to cause movement of said two points of said housing in a direction away from each other so that said pulling members will exert a pulling force upon said electrically conductive connector great enough to break the same and to permanently interrupt the electrical connection between said two current-carrying members.

5. In combination, electrical apparatus including a fluid-tightly closed housing; at least two current-carrying members mounted within said housing; an electrically conductive connector mounted between said current-carrying members; a first pulling member secured to said electrically conductive connector and also secured to a first point of said housing member; a second pulling member secured to said electrically conductive connector spaced from said point at which said first pulling member is secured, said second pulling member also being secured to a point of said housing spaced from and arranged substantially opposite said first point of said housing to which said first pulling member is secured; lost motion means for connecting one of said pulling members to said electrically conductive connector; and a fluid substantially filling the remainder of said housing, whereby when said electrical apparatus is overloaded during considerable time said fluid will be heated and expand sufficiently to cause movement of said two points of said housing in a direction away from each other so that said pulling members will exert a pulling force upon said electrically conductive connector great enough to break the same and to permanently interrupt the electrical connection between said two current-carrying members.

6. In combination, electrical apparatus including a fluid-tightly closed housing; at least two current-carrying members mounted within said housing; an electrically conductive connector mounted between said current-carrying members; a first pulling member secured to said electrically conductive connector and also secured to a first point of said housing member; a second pulling member secured to said electrically conductive connector spaced from said point at which said first pulling member is secured, said second pulling member also being secured to a point of said housing spaced from and arranged substantially opposite said first point of said housing to which said first pulling member is secured; lost motion means for connecting one of said pulling members to said electrically conductive connector, said lost motion means being formed by an elongated aperture in said electrically conductive connector and a hook-shaped portion on said one pulling member passing with considerable clearance through said aperture; and a fluid substantially filling the remainder of said housing, whereby when said electrical apparatus is overloaded during considerable time said fluid will be heated and expand sufficiently to cause movement of said two points of said housing in a direction away from each other so that said pulling members will exert a pulling force upon said electrically conductive connector great enough to break the same and to permanently interrupt the electrical connection between said two current-carrying members.

References Cited in the file of this patent
UNITED STATES PATENTS

| 1,265,765 | Ferris | May 14, 1918 |
| 1,909,234 | Spurgeon | May 16, 1933 |